United States Patent [19]

Wiegand et al.

[11] Patent Number: 5,138,351
[45] Date of Patent: Aug. 11, 1992

[54] BATTERY CHARGING APPARATUS WITH REMOVABLE PLUG MODULE

[75] Inventors: Philip J. Wiegand, Rochester; David R. Dowe, Holley, both of N.Y.

[73] Assignee: Eastman Kodak Company, Rochester, N.Y.

[21] Appl. No.: 698,214

[22] Filed: May 10, 1991

[51] Int. Cl.⁵ .............................................. G03B 21/28
[52] U.S. Cl. .................................... 354/81; 354/293; 320/2; 320/48; 439/501
[58] Field of Search .............. 354/484, 76, 80, 293, 354/81; 320/2, 48; 439/501, 502, 504, 509

[56] References Cited

U.S. PATENT DOCUMENTS

| | | | |
|---|---|---|---|
| 3,287,076 | 11/1966 | Spofford | 312/206 |
| 3,518,711 | 7/1970 | Radcliffe | 15/23 |
| 3,519,914 | 7/1970 | Fujimaki et al. | 320/2 |
| 3,659,180 | 4/1972 | Urbush | 320/2 |
| 4,260,230 | 4/1981 | Suzuki | 354/484 |
| 4,494,854 | 1/1985 | Yamaga et al. | 354/484 |
| 4,558,270 | 12/1985 | Liataud et al. | 320/2 |
| 4,585,194 | 4/1986 | Schwob | 439/501 |
| 4,645,325 | 2/1987 | Inoue et al. | 354/484 |
| 4,792,762 | 12/1988 | Shiina et al. | 324/426 |

FOREIGN PATENT DOCUMENTS 3736330  5/1989  Fed. Rep. of Germany ...... 439/509

*Primary Examiner*—W. B. Perkey
*Assistant Examiner*—Cassandra C. Spyron
*Attorney, Agent, or Firm*—Roger A. Fields

[57] ABSTRACT

A camera or other device having a rechargeable battery is intended to be stored normally in a cavity of a charging-stand cradle in order to restore an electrical charge to the battery. The cradle includes a plug module that may be electrically connected to a standard alternating current (AC) outlet when the plug module is affixed to the cradle. Conversely, the plug module may be separated from the cradle to connect it to a remote AC outlet.

8 Claims, 6 Drawing Sheets

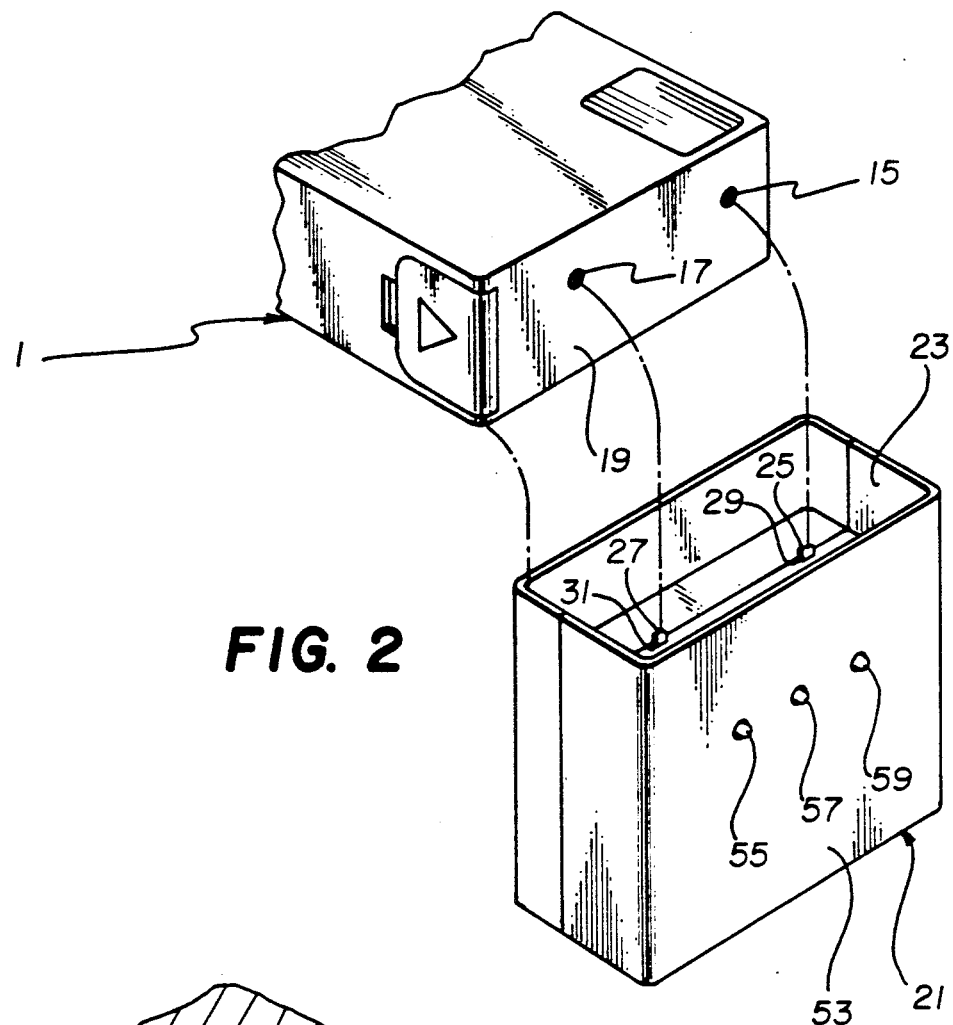
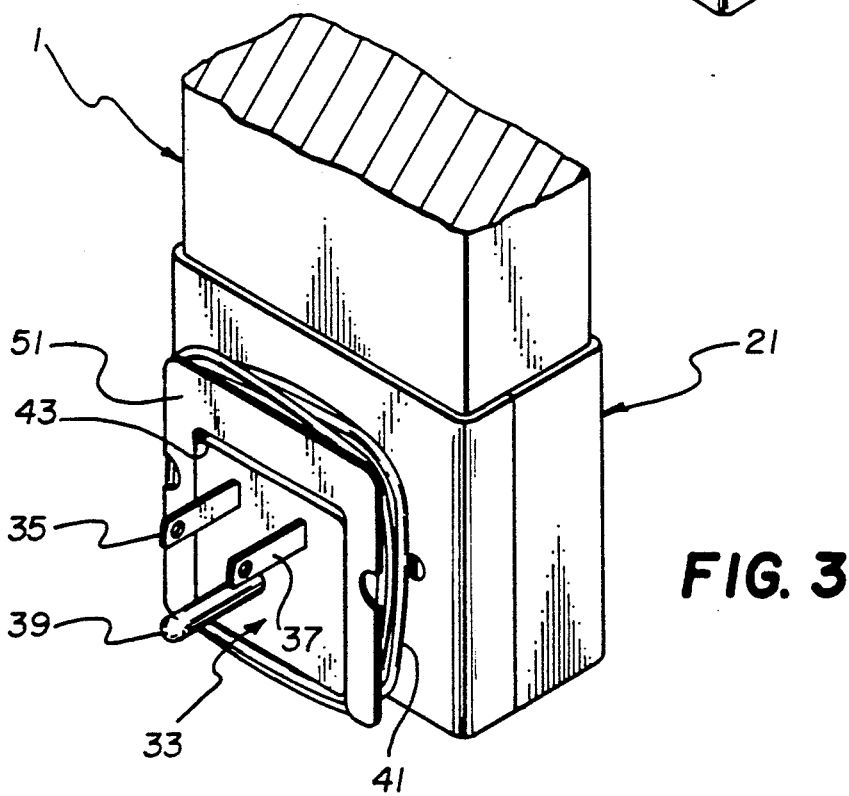

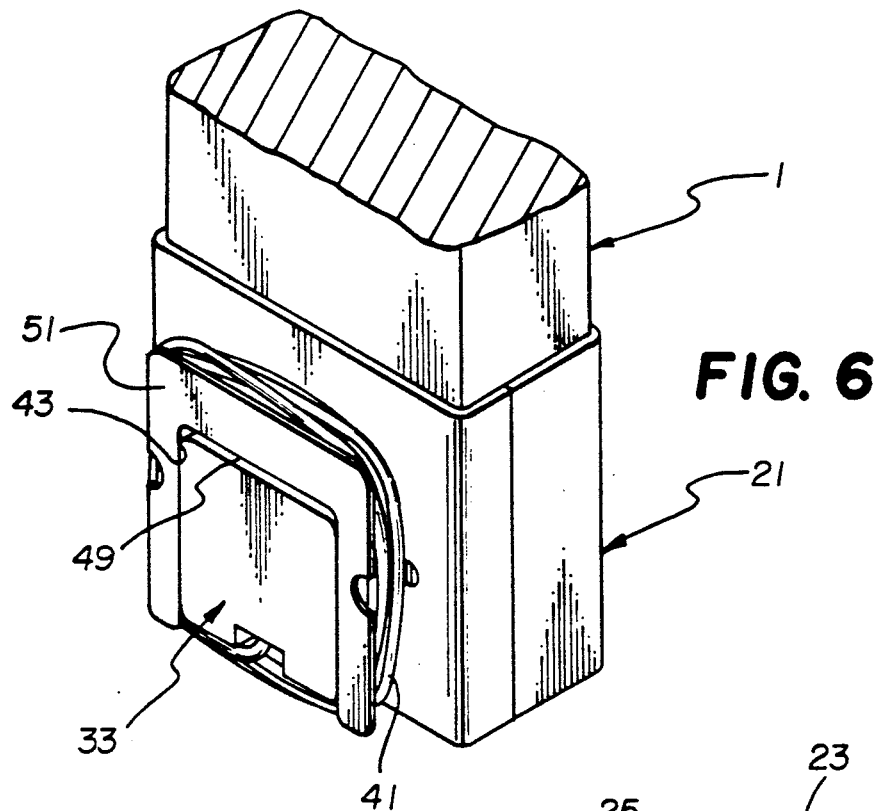
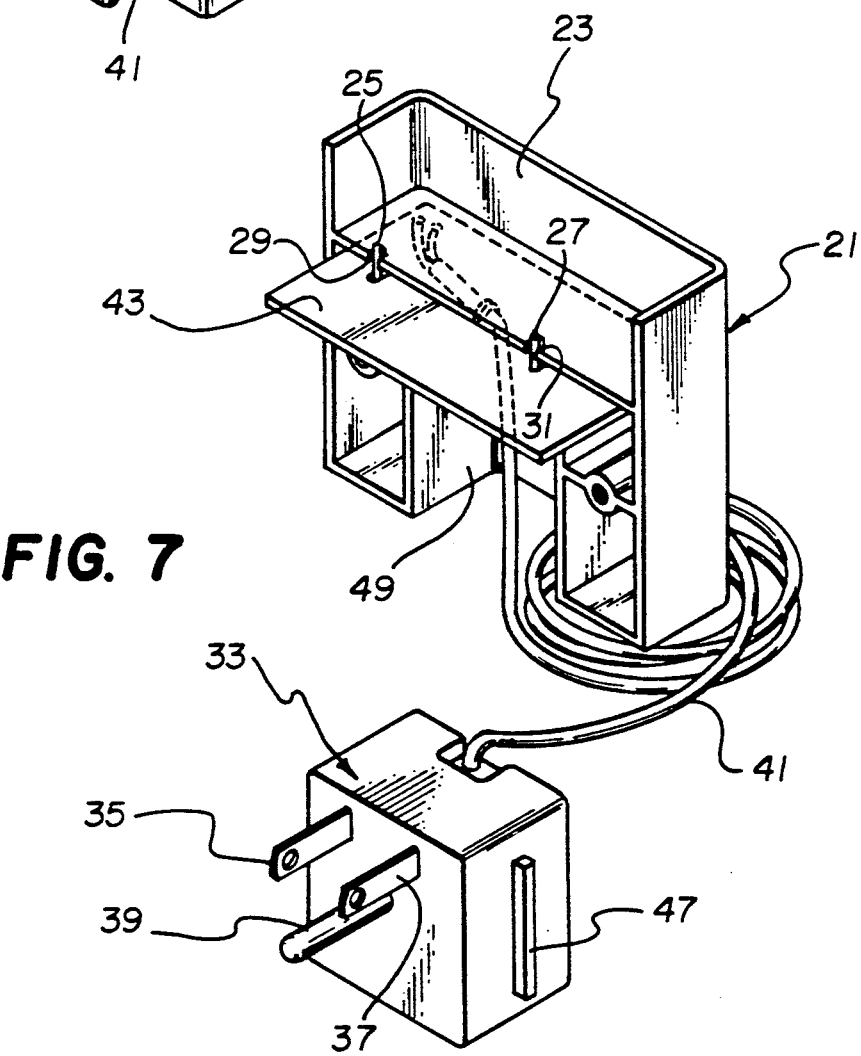

BATTERY CHARGING APPARATUS WITH REMOVABLE PLUG MODULE

BACKGROUND OF THE INVENTION

1. Field of the Invention

The invention relates generally to a battery charging apparatus for restoring an electrical charge to a rechargeable battery, and in particular to a charging-stand cradle to be used with a battery powered camera or other battery powered device.

2. Description of the Prior Art

There is an increasing environmental concern as to how to dispose of non-reuseable batteries for cameras and other battery powered devices. Of course, rechargeable batteries, such as the known nicke-cadmium type, and plug-in battery chargers for restoring an electrical charge to a rechargeable battery have been available for a number of years. However, many users may find it a nuisance and perhaps difficult to remove a rechargeable battery from a camera or other battery powered device, to electrically connect the rechargeable battery to the battery charger, and to reinstall the recharged battery in the camera. More particularly, with a camera, many users keep the camera in a protective case when it is not in use, and therefore may neglect the charge condition of the rechargeable battery.

SUMMARY OF THE INVENTION

According to the invention, a camera or other device having a rechargeable battery is intended to be stored normally in a cavity of a charging-stand cradle in order to restore an electrical charge to the battery. The cradle includes a plug module that may be electrically connected to a standard alternating current (AC) outlet when the plug module is affixed to the cradle. Conversely, the plug module may be separated from the cradle to connect it to a remote AC outlet.

More particularly, the charging-stand cradle is designed to serve as an alternative to a protective case for the camera and, at the same time, restore an electrical charge to a rechargeable battery inside the camera without having to remove the battery from the camera.

BRIEF DESCRIPTION OF THE DRAWINGS

FIG. 2 is a perspective view similar to FIG. 1, showing how the camera is inserted into a cavity of the cradle;

FIG. 3 is a rear perspective view of the camera inserted in the cavity of the cradle, showing a plug module affixed to the cradle in an upright use position;

FIG. 6 is a perspective view similar to FIG. 3, showing the plug module affixed to the cradle in a reversed storage position;

FIG. 7 is a rear perspective view of a front half of the cradle and an interior circuit board that is electrically connected via a wire lead to the plug module;

DETAILED DESCRIPTION OF THE PREFERRED EMBODIMENT

Figure 9:
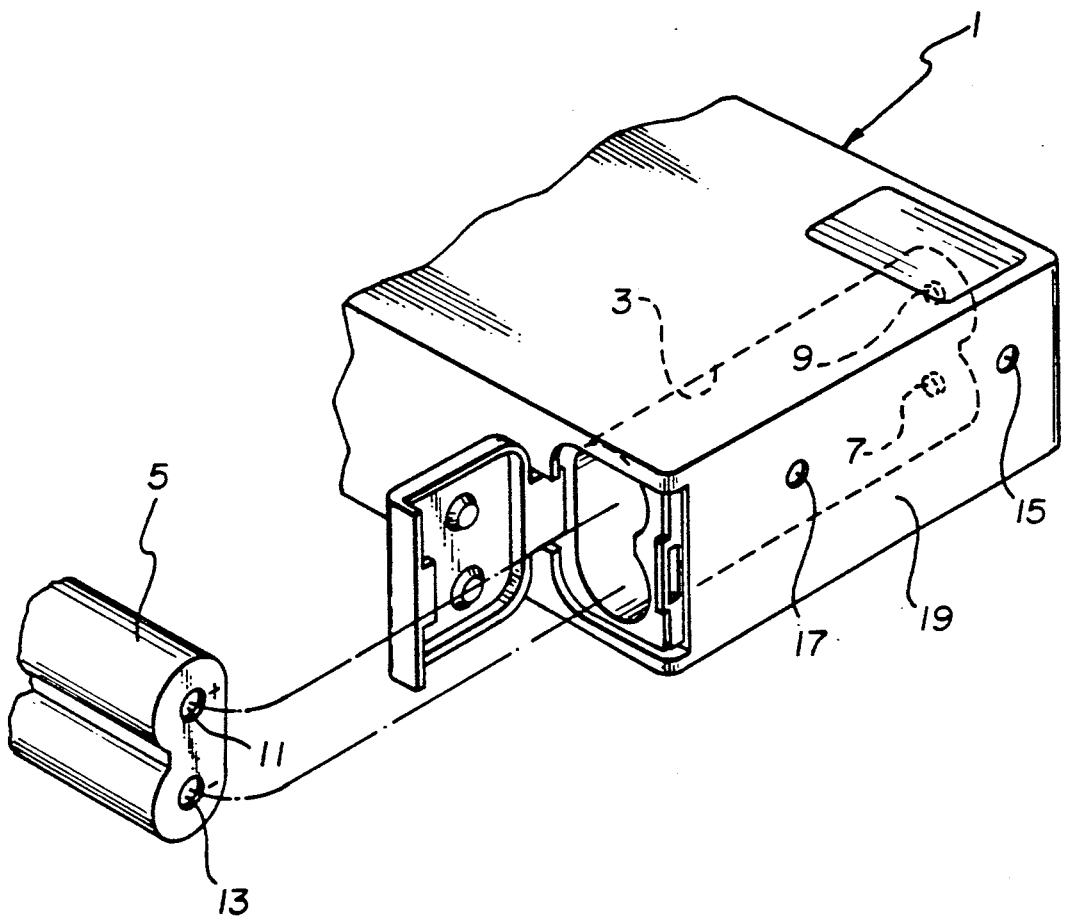
FIG. 9 is a front perspective view of the camera, showing an interior battery chamber.

Referring first to FIG. 9, a camera 1 is shown has an internal battery chamber 3 for holding a conventional rechargeable battery 5, such as the known nickel-cadmium type. A pair of internal electrical conductor tabs 7 and 9 are located in the chamber 3 for making electrical contact with respective positive and negative terminals 11 and 13 of the battery 5. A pair of external electrical conductor pins 15 and 17 accessible at one exterior side 19 of the camera 1 are connected by suitable wire leads, not shown, to the internal conductor tabs 7 and 9.

As shown in FIGS. 1-3 and 7, a battery charging apparatus preferably in the form of a charging-stand cradle 21 has a cavity 23 configured for receiving the camera 1 to support the camera in a battery charging position. A pair of electrical conductor pins 25 and 27 are located in respective openings 29 and 31 at the bottom of the cavity 23 for making electrical contact with the two external conductor pins 15 and 17 of the camera to restore an electrical charge to the battery 5 when the camera is supported in the cavity in the battery charging position. See FIG. 2.

An electrical plug module 33 has a pair of input and output prongs 35 and 37 and a ground prong 39 each configured to be inserted into a conventional alternating current (AC) outlet. See FIG. 3. The plug module 33 is connected to the two conductor pins 25 and 27 via a wire lead 41 which is soldered to a circuit board 43 that supports the two conductor pins. See FIG. 7. The wire lead 41 is long enough to permit the plug module 33 to be located remotely from the cradle 21 as in FIG. 5.

Figure 1:
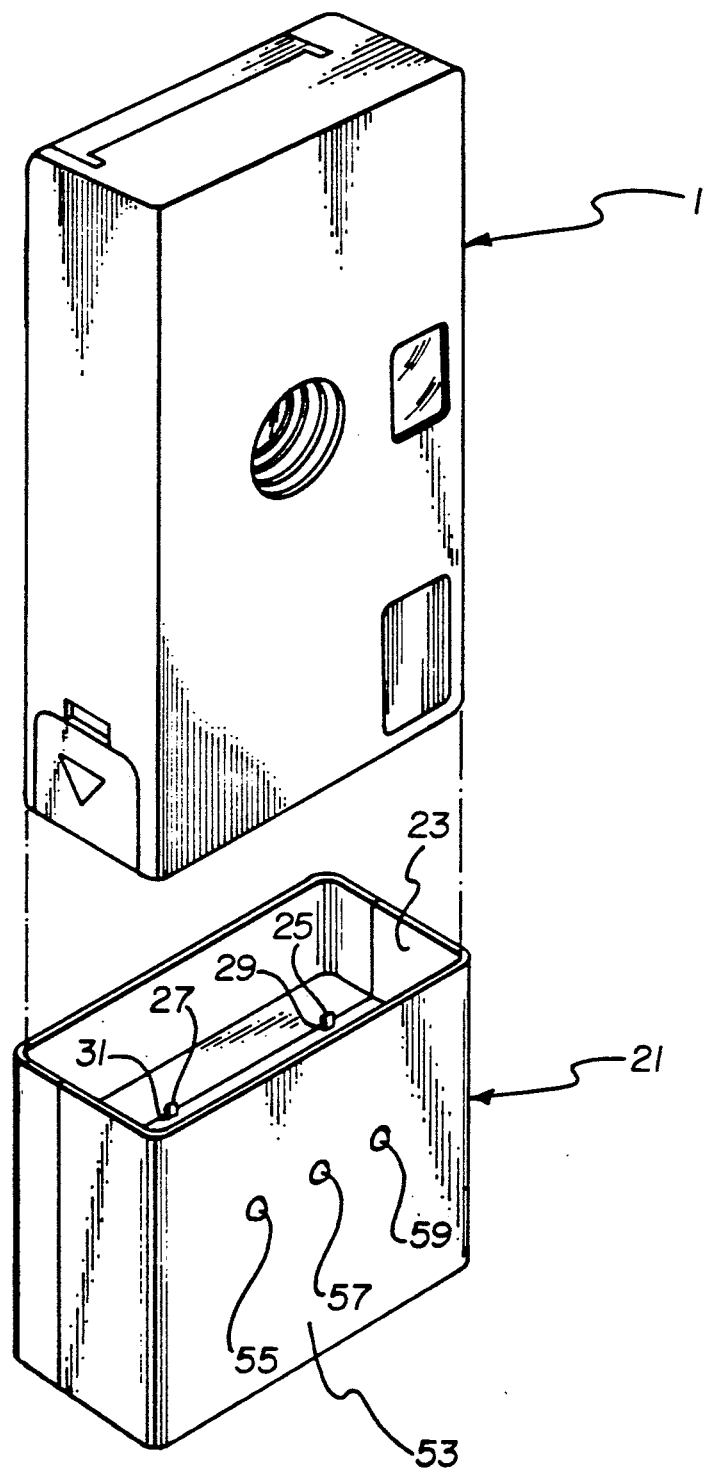
FIG. 1 is a front perspective view of a charging-stand cradle and a camera for use with the cradle, according to a preferred embodiment of the invention.
Figure 4:
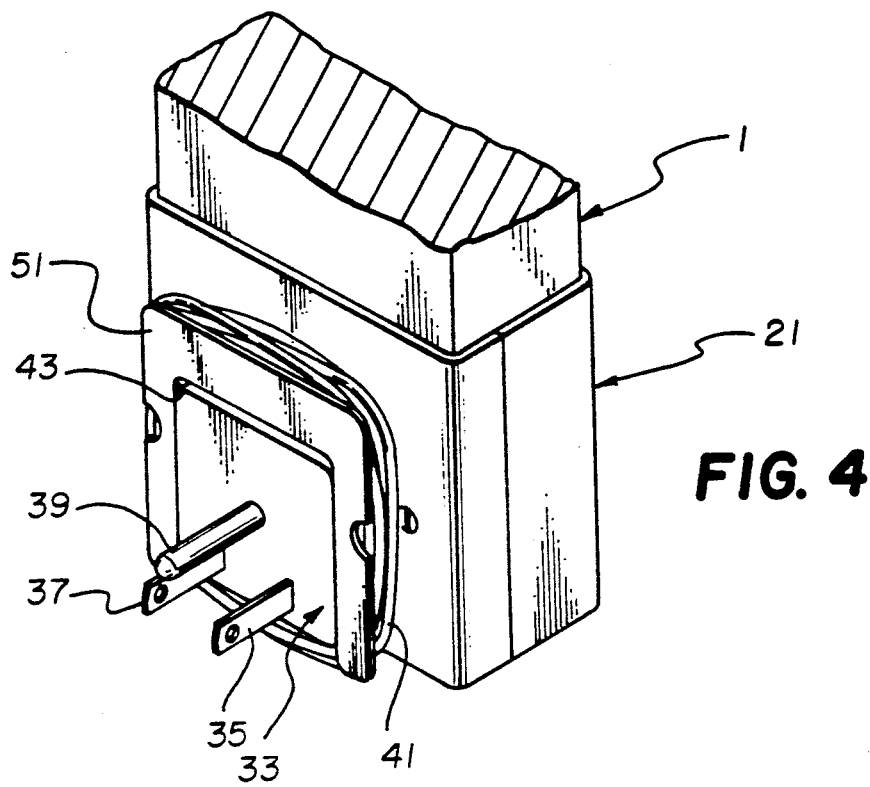
FIG. 4 is a perspective view similar to FIG. 3, showing the plug module affixed to the cradle in an inverted use position.
Figure 5:
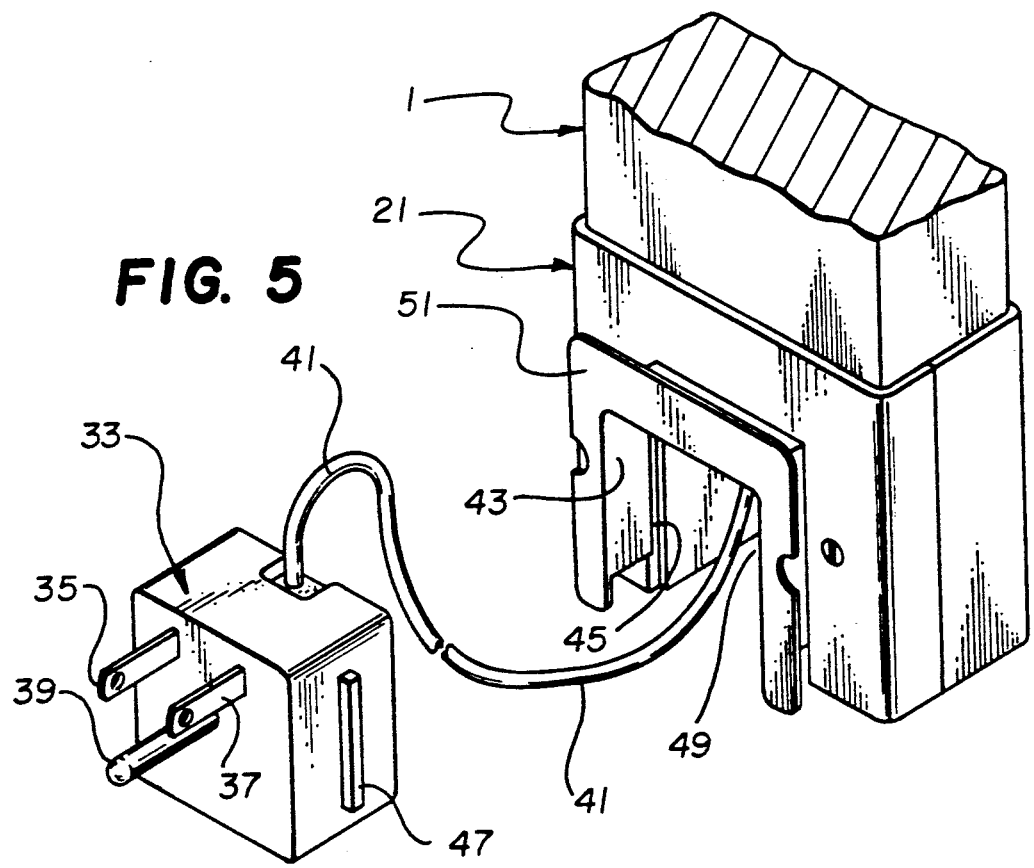
FIG. 5 is a perspective view similar to FIG. 3, showing the plug module removed from the cradle in a further use position.

The cradle 21 includes a securement bracket 43, shown in FIG. 5, that includes a pair of opposite slot (only one shown) 45 for receiving respective ears 47 (only one shown) of the plug module 33 to affix the plug module removably to the cradle. This permits the plug module to be inserted into a conventional AC outlet when the plug module is affixed to the cradle 21 as in FIGS. 3 and 4 or is removed from the cradle as in FIG. 5.

The slots 45 of the cradle 21 and the ears 47 of the plug module 33 enable the plug module to be affixed to the cradle in respective orientations in which the ground prong 39 is located below the input and output prongs 35 and 37 as in FIG. 3 or is located above the input and output prongs as in FIG. 4. This permits the plug module 33 to be plugged into a conventional AC outlet when the plug module is affixed to the cradle 21, regardless of an upright or inverted orientation of the AC outlet.

The slots 45 and the ears 47 enable the plug module 33 to be affixed to the cradle 21 in a storage position in which the input, output and ground prongs 35, 37 and 39 face inwardly with respect to the cradle to project into a cavity 49 of the cradle. See FIGS. 5, 6 and 7.

The securement bracket 43 includes a skirted periphery 51 about which the wire lead 41 can be wrapped to store the wire lead when the plug module 33 is affixed to the cradle 21. See FIGS. 3, 4, 5 and 6.

A front face 53 of the cradle 21 includes three evenly spaced light-emitting diodes (LED's) 55, 57 and 59 which are electrically connected to the circuit board 43.

The LED 55 when energized provides a "power on" indication. The LED 57 when energized provides an indication that a rechargeable battery is being charged. The LED 59 when energized provides an indication that the particular battery attempted to be charged is a non-rechargeable one, such as a known alkaline type, and therefore is the wrong battery.

Figure 8:
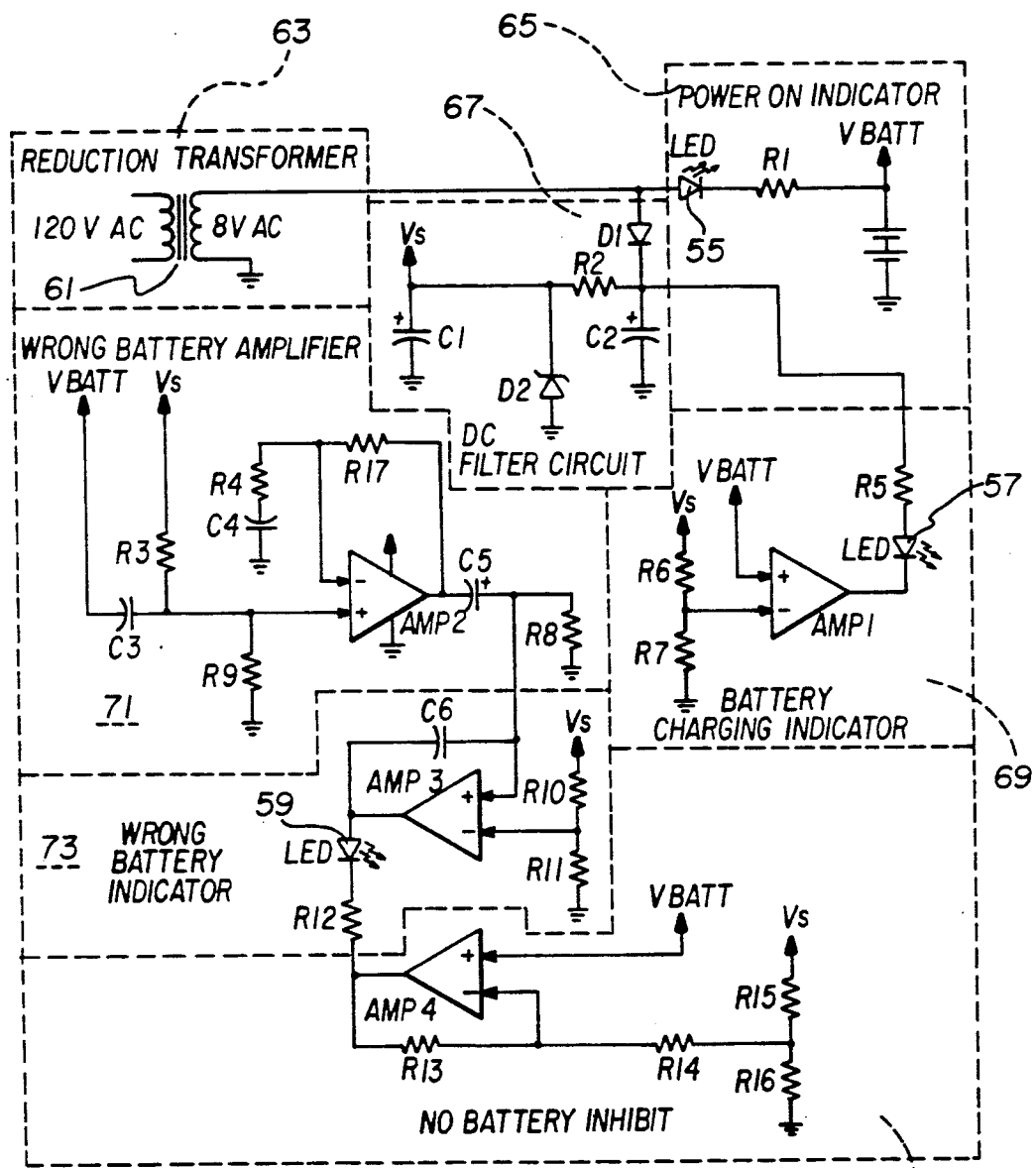
FIG. 8 is a circuit diagram generally of the circuit board depicted in FIG. 6.

A circuit diagram of the circuit board 43 is shown in FIG. 8. According to custom, in the circuit diagram, reference letters "C" indicate various capcitors, reference letters "R" indicate various resistors, reference letters "D" indicate various diodes, reference letters AMP indicate various op amps, reference letters $V_s$ indicate a reference voltage, reference letters $V_{batt}$ indicate a battery voltage, etc. In addition, a 120 volt AC to 8 volt AC reduction transformer 61 may be built into the plug module 33. As shown in FIG. 8, the circuit diagram is divided into several component sections comprising a voltage reduction section 63 which includes the reduction transformer 61, a power on indicator section 65 which includes the LED 55, a typical direct current (DC) filter section 67, a battery charging indicator section 69 which includes the LED 57, a typical wrong battery amplifier section 71, a wrong battery indicator section 73 which includes the LED 59, and a no battery inhibit section 75 which prevents the LED 59 from being energized when the camera 1 is supported in the cavity 23 of the cradle 21 but no battery is present in the camera. In operation, the reduction transformer 61 converts a 120 volt AC to a 8 volt AC when the plug module 33 is plugged into a conventional AC outlet. In turn, the 8 volt AC is half-wave rectified by the LED 55 into a direct current (DC). A resistor R1 limits the current to the battery being charged. While the battery is being charged, current passes through the resistor R1 and LED 55, causing the LED to glow to thus provide a power on indication. The 8 volt AC is also half-wave rectified by the diode D1 into a DC for the rest of the circuit sections, and capacitors C1 and C2 filter the half-wave DC to create a purer DC. A zenor diode D2 regulates the resultant voltage to 6.2 volts, to be used as a reference voltage $V_s$. The actual voltage $V_{batt}$ from the battery being charged and a reduced reference voltage determined by the reference voltage $V_s$ and two resistors R6 and R7 are fed into an op amp AMP 1. When the voltage $V_{batt}$ from the battery is less than the reduced reference voltage, the LED 57 glows to thus provide a charging indication. Conversely, when the voltage $V_{batt}$ from the battery is greater than the reduced reference voltage, the LED 57 no longer glows to thus provide a full charge indication. If the battery is a non-rechargeable one, the actual voltage $V_{batt}$ from the battery is different than in the case of a rechargeable one, and the resistors R10, R11 and R12, the capcitor C6, and the op amp AMP 3 compare the difference as amplified by the op amp AMP 2 to another reduced reference voltage determined by the voltage $V_S$ and the resistors R10 and R11. When the other reduced reference voltage is less than the amplified voltage, the LED 59 flashes to thus provide a wrong battery indication. If no battery is present, the LED 59 is prevented from flashing by the resistors R13, R14, R15, and R16 and the op amp AMP 4.

The invention has been described with reference to a preferred embodiment. However, it will be appreciated that variations and modifications can be effected within the ordinary skill of the art without departing from the scope of the invention.

We claim:
1. A battery charging apparatus is characterized in that:
   a charging-stand cradle has a cavity configured for receiving a camera to support the camera in a battery charging position;
   electrical conductor means is located in at least one opening to said cavity for making electrical contact with corresponding conductor means of the camera to restore an electrical charge to a rechargeable battery inside the camera when the camera is supported in the cavity in the battery charging position;
   an electrical plug module having a pair of input and output prongs and a ground prong each configured to be inserted into a conventional alternating current outlet is connected to said electrical conductor means via an electrically conductive wire lead that is long enough to permit said plug module to be located remotely from said cradle; and
   securement means is located on said cradle for affixing said plug module removably to the cradle to permit said input, output and ground prongs to be inserted into a conventional alternating current outlet when the plug module is affixed to the cradle or is removed from the cradle.

2. A battery charging apparatus as recited in claim 2, wherein said cradle includes support means about which said wire lead can be wrapped to store the wire lead when said plug module is affixed to said cradle.

3. A battery charging apparatus as recited in claim 1, wherein said securement means includes integral means for affixing said plug module to said cradle selectively in respective orientations in which said ground prong is located below said input and output prongs or the ground prong is located above the input and output prongs to permit the plug module to be plugged into a conventional alternating current outlet when the plug module is affixed to the cradle in either of the orientations.

4. A battery charging apparatus as recited in claim 1, wherein said securement means includes integral means for affixing said plug module to said cradle selectively in a storage position in which said input, output and ground prongs face inwardly with respect to the cradle and a use position in which the input, output and ground prongs face outwardly with respect to the cradle.

5. A battery charging apparatus as recited in claim 4, wherein said cradle has a cavity for receiving said input, output and ground prongs when said plug module is affixed to the cradle in the storage position.

6. A battery charging apparatus is characterized in that:
   a charging-stand cradle is configured for receiving a battery powered device to support the device in a battery charging position;
   electrical conductor means is located on said cradle for making electrical contact with corresponding conductor means of the battery powered device to restore an electrical charge to a rechargeable battery inside the device when the device is supported in the battery charging position;
   an electrical plug module adapted to be inserted into a conventional alternating current outlet is connected to said electrical conductor means via an electrically conductive wire lead that is long enough to permit said plug module to be located remotely from said cradle; and securement means is located on said cradle for affixing said plug module removably to the cradle to permit the plug module to be inserted into a conventional alternating current outlet when the plug module is affixed to the cradle or is removed from the cradle.

7. A battery charging apparatus as recited in claim 6, wherein said cradle includes securement means for affixing said plug module to the cradle selectively in a storage position in which said input, output and ground prongs face inwardly with respect to the cradle and a use position in which the input, output and ground prongs face outwardly with respect to the cradle.

8. A battery charging apparatus as recited in claim 6, further characterized in that:
respective indicator means are connected to said conductor means of said charging-stand cradle for providing perceptable indications when the battery powered device is supported in the cavity in the battery charging position that the particular battery inside the device is a rechargeable one or is a non-rechargeable one.

* * * * *